US012759541B2

(12) United States Patent
Takeda

(10) Patent No.: US 12,759,541 B2
(45) Date of Patent: Oct. 13, 2026

(54) VEHICLE DRIVING ASSISTANCE DEVICE AND VEHICLE DRIVING ASSISTANCE METHOD

(71) Applicant: TOYOTA JIDOSHA KABUSHIKI KAISHA, Toyota (JP)

(72) Inventor: Tomoya Takeda, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 18/882,760

(22) Filed: Sep. 12, 2024

(65) Prior Publication Data

US 2025/0145151 A1 May 8, 2025

(30) Foreign Application Priority Data

Nov. 7, 2023 (JP) ................................ 2023-189863

(51) Int. Cl.
*B60W 30/09* (2012.01)
*G01S 13/931* (2020.01)

(52) U.S. Cl.
CPC .......... *B60W 30/09* (2013.01); *G01S 13/931* (2013.01); *B60W 2420/408* (2024.01)

(58) Field of Classification Search
CPC ............ B60W 30/09; B60W 30/0956; B60W 2420/408; G01S 13/931
See application file for complete search history.

(56) References Cited

U.S. PATENT DOCUMENTS

| | | | | |
|---|---|---|---|---|
| 9,105,190 | B2 | 8/2015 | Akiyama | |
| 9,393,960 | B2 | 7/2016 | Kodaira | |
| 9,483,945 | B2 | 11/2016 | Okita et al. | |
| 9,873,412 | B2 | 1/2018 | Moriizumi | |
| 10,793,147 | B2 | 10/2020 | Kaminade et al. | |
| 11,214,267 | B2 * | 1/2022 | Ike | B60W 50/14 |
| 11,361,199 | B2 * | 6/2022 | Mizoguchi | G01S 13/931 |
| 12,007,475 | B2 * | 6/2024 | Okabe | G01S 15/931 |
| 2021/0061309 | A1 | 3/2021 | Kawanai | |
| 2021/0107521 | A1 | 4/2021 | Fujita et al. | |

(Continued)

FOREIGN PATENT DOCUMENTS

JP 2004-106701 A 4/2004

*Primary Examiner* — Gonzalo Laguarda
(74) *Attorney, Agent, or Firm* — SoraIP, Inc.

(57) ABSTRACT

A host vehicle includes a sonar device that acquires sonar information, including information on a target around the host vehicle and information representing the reflection intensity of an ultrasonic wave reflected by the target, using an ultrasonic wave and a driving assistance ECU that executes automatic braking for the host vehicle when it is determined, based on the sonar information, that a predetermined collision avoidance execution condition is satisfied. When the sonar information indicates that a target is around the host vehicle and the reflection intensity, included in the sonar information, is lower than a predetermined intensity threshold value, the driving assistance ECU executes automatic braking at a time the collision avoidance execution condition is satisfied only when a predetermined execution permission condition, including an erroneous depression determination condition that is satisfied when the driver of the host vehicle is assumed to have erroneously depressed an accelerator pedal, is satisfied.

10 Claims, 4 Drawing Sheets

(56) References Cited

U.S. PATENT DOCUMENTS

| | | | | |
|---|---|---|---|---|
| 2021/0107528 | A1 | 4/2021 | Fujita et al. | |
| 2021/0146956 | A1 | 5/2021 | Fujita et al. | |
| 2021/0146958 | A1 | 5/2021 | Tanaka et al. | |
| 2025/0178601 | A1* | 6/2025 | Unigame | B60W 50/14 |

* cited by examiner

VEHICLE DRIVING ASSISTANCE DEVICE AND VEHICLE DRIVING ASSISTANCE METHOD

CROSS-REFERENCE TO RELATED APPLICATION

This application claims priority to Japanese Patent Application No. 2023-189863 filed on Nov. 7, 2023, incorporated herein by reference in its entirety.

BACKGROUND

1. Technical Field

The present disclosure relates to a vehicle driving assistance device and a vehicle driving assistance method that execute automatic braking on a host vehicle to avoid a collision between the host vehicle and a target.

2. Description of Related Art

When a host vehicle is going to start but the distance between the host vehicle and a target, measured by a radar, is equal to or smaller than a predetermined value, a conventional device determines that the target is an obstacle dangerous to the host vehicle, issues a warning, and performs automatic braking (see, for example, Japanese Unexamined Patent Application Publication No. 2004-106701 (JP 2004-106701 A)).

SUMMARY

However, especially when the target is a pedestrian or a bicycle, the intensity of a reflected wave, which is generated when a radio wave sent from the radar is reflected by the target, is not high and, therefore, the height of the target is unclear. As a result, it impossible to accurately distinguish whether the detected target is a target with a possibility of collision or is a target such as a manhole or a small bump. For this reason, though not supposed to be necessary as a collision avoidance operation, automatic braking is performed in some cases, making the driver feel that the automatic braking is troublesome. Another device is also proposed that recognizes a target based on image data acquired by a camera and then executes automatic braking on that target. However, when the distance between the target and the host vehicle is short, the entire target is not included in the image data (so-called "cut-off" occurs), making it difficult to accurately measure the distance between the target and the host vehicle. Therefore, when automatic braking is executed based on image data, the problem is that unnecessary automatic braking may be executed as in the case when automatic braking is executed based only on information from the radar.

The present disclosure is made to solve the problem described above. That is, one of the objects of the present disclosure is to provide a vehicle driving assistance device and a method thereof that can execute effective automatic braking, especially for a target positioned near the host vehicle, while reducing the frequency of unnecessary automatic braking.

One aspect of the present disclosure relates to a vehicle driving assistance device including a sonar device (40) and a controller (10). The sonar device (40) is configured to acquire sonar information using an ultrasonic wave. The sonar information includes information on a target positioned around a host vehicle and information representing the reflection intensity of an ultrasonic wave reflected by the target. The controller (10) is configured to execute automatic braking (S355) for the host vehicle when it is determined, based on the sonar information, that a predetermined collision avoidance execution condition is satisfied.

When the sonar information indicates that a target is positioned around the host vehicle (S315: Yes) and the reflection intensity included in the sonar information is lower than a predetermined intensity threshold value (S320: No), the controller (10) is configured to execute the automatic braking (S355) at a time the collision avoidance execution condition is satisfied only when a predetermined execution permission condition, including an erroneous depression determination condition that is satisfied when the driver of the host vehicle is assumed to have erroneously depressed the accelerator pedal of the host vehicle (S350: Yes), is satisfied.

Since the height of a target is particularly unclear when the reflection intensity included in the sonar information is lower than the predetermined intensity threshold value, it is unlikely that the target included in the sonar information is suitable for executing automatic braking. Therefore, in the aspect described above, when the reflection intensity included in the sonar information is lower than the predetermined intensity threshold value, the automatic braking based on the sonar information is not executed unless the execution permission condition including the erroneous depression determination condition, which is satisfied when the accelerator pedal is erroneously depressed, is satisfied. This can reduce the frequency of unnecessary execution of automatic braking. On the other hand, according to the aspect described above, even when the reflection intensity included in the sonar information is lower than the predetermined intensity threshold value but when the execution permission condition, including the erroneous depression determination condition, is satisfied, the automatic braking based on the sonar information can be executed. This can reduce the possibility of a collision with a target immediately after a sudden start of the host vehicle. In addition, in this case, even when the target is not suitable for executing the automatic braking, the accelerator pedal is erroneously depressed in the first place and, therefore, the automatic braking can function effectively to prevent a sudden start of the host vehicle and, at the same time, the driver is unlikely to find the automatic braking bothersome.

In the above description, the names and/or reference numerals used in an embodiment are added in parentheses to the components of the disclosure corresponding to the embodiment, which will be described later, to help understand the present disclosure. However, the components of the present disclosure are not limited to the embodiment defined by the above names and/or reference numerals. The present disclosure is applicable also to a vehicle driving assistance method and a program thereof.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A "vehicle driving assistance device DS" (hereinafter referred to as "device DS") according to an embodiment of the present disclosure includes the components shown in FIG. 1 and is applied to (mounted on) a host vehicle HV. The host vehicle HV may be any one of a vehicle powered by an internal combustion engine, a vehicle powered by an electric motor (i.e. a battery electric vehicle), and a hybrid electric vehicle.

In this specification, "ECU" is an electronic control unit (control unit) that includes a microcomputer including a CPU (processor), a ROM, a RAM, a data writable nonvolatile memory, an interface, etc. The ECU is also called a controller or a computer. A plurality of ECUs shown in FIG. 1 is connected to each other through CAN so that they can exchange information. Some or all of the ECUs may be integrated into one ECU.

Figure 1:
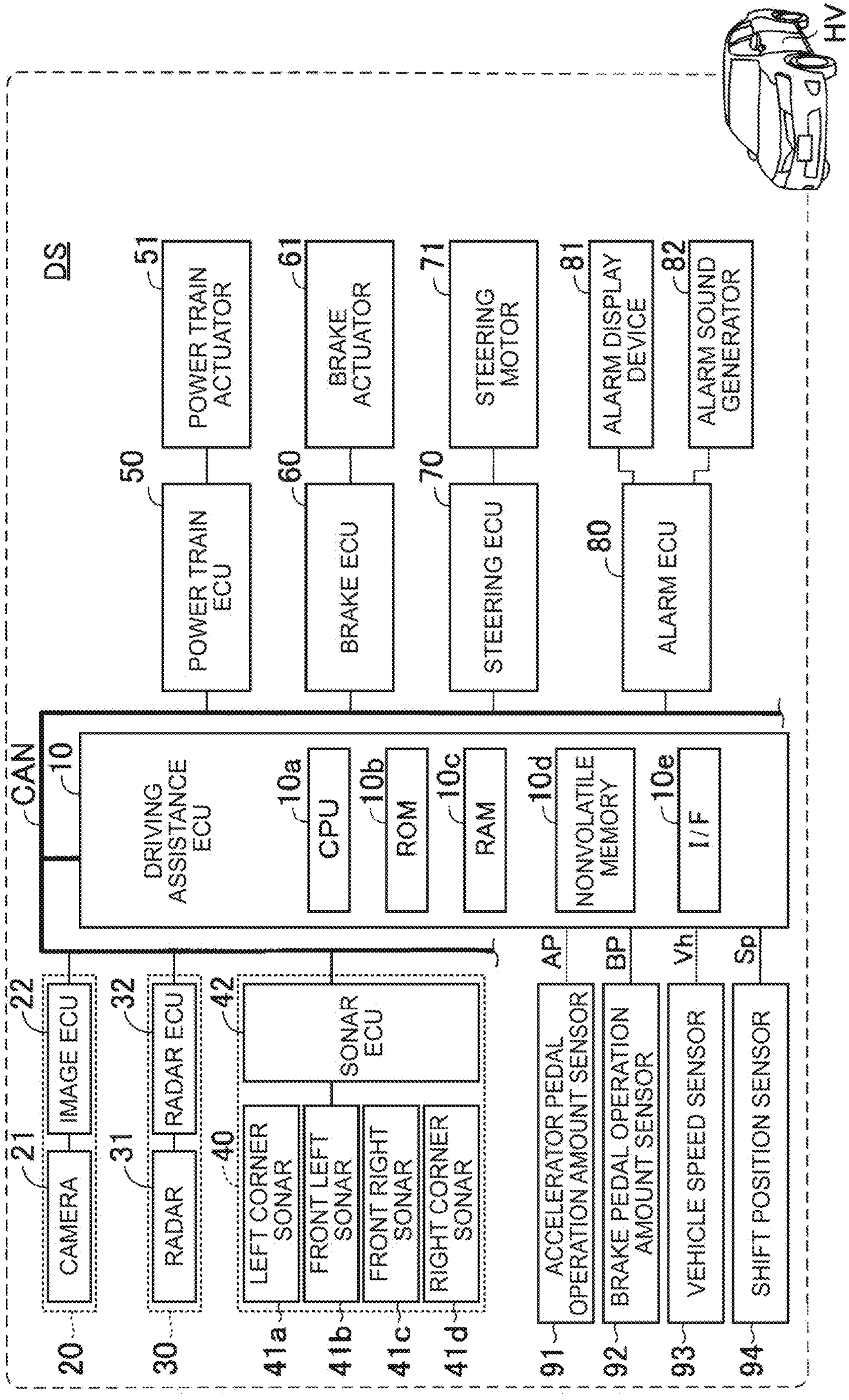
FIG. 1 is a schematic configuration diagram of a vehicle driving assistance device according to an embodiment of the present disclosure.

A driving assistance ECU 10 uses the components, shown in FIG. 1, to execute automatic braking (automatic brake) control that is one type of collision avoidance assistance control.

Figure 2:
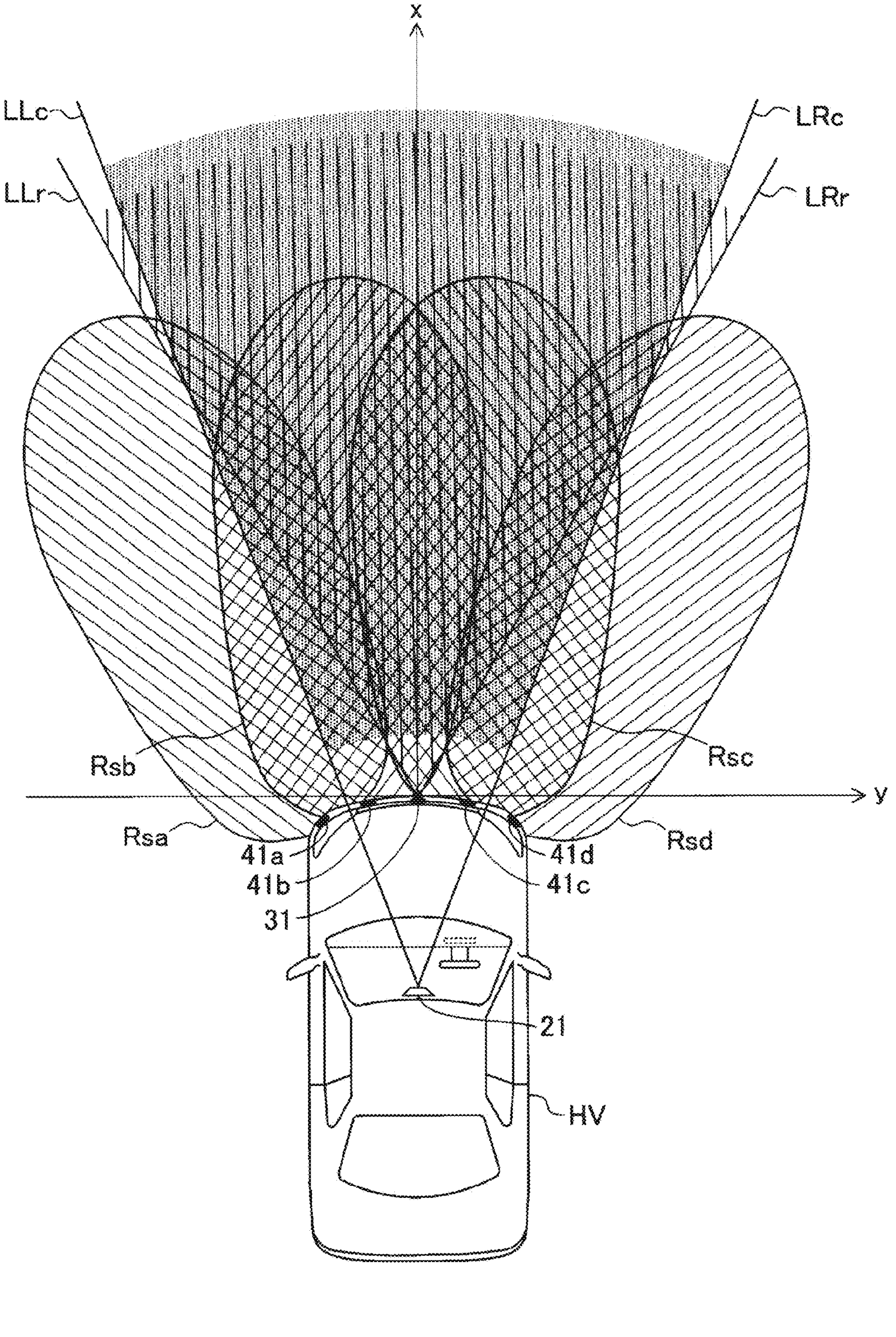
FIG. 2 is a plan view of a host vehicle showing the mounting positions and detection ranges of a camera, a radar, and sonars shown in FIG. 1.

A camera device 20 includes a camera 21 and an image ECU 22. The camera 21, placed at the upper center of the front windshield on the vehicle cabin side of the host vehicle HV as shown in FIG. 2, captures the scene in front of the host vehicle HV, included in the range between the straight line LRc and the straight line LLc, for acquiring image data. The image ECU 22 analyzes the image data, received from the camera 21, to generate camera information every predetermined time period and sends the generated camera information to the driving assistance ECU 10. The camera information includes the image data itself and the camera target information on the captured target such as "the position, relative longitudinal speed, and relative lateral speed with respect to the host vehicle HV, and the type." Types of targets include moving objects, such as other vehicles and pedestrians, and non-moving structures. In addition, as will be described later, the camera device 20 (image ECU 22) functions also as a surrounding environment information acquisition device that acquires information about the surrounding environment of the host vehicle HV based on the image data. Note that, when the distance between the target and the host vehicle HV is very short, the image ECU 22 may not be able to accurately acquire the position of the target since the entire target is not included in the image data (in other words, only a part of the target is included in the image data).

The radar device 30, a known device that uses millimeter waveband radio waves to acquire the information about targets around the host vehicle HV, includes a radar 31 and a radar ECU 32. The radar 31, placed at the center of the front end of the host vehicle HV as shown in FIG. 2, sends a millimeter wave to the detection range between the straight line LRr and the straight line LLr, receives a reflected wave generated when the sent millimeter wave is reflected by a target, and sends the information about the sent and received millimeter waves to the radar ECU 32. Based on the information received from the radar 31, the radar ECU 32 acquires the radar information every predetermined time period, and sends the received radar information to the driving assistance ECU 10. The radar information includes the information such as the distance to the target, the direction of the target, the relative speed of the target. Note that, since the intensity of the reflected wave is weak, for example, when the target is a pedestrian, the radar ECU 32 may not be able to accurately acquire the position of the target. Also note that the radar ECU 32 may not be able to distinguish whether the target is a target that requires collision avoidance operation or is a target that does not require collision avoidance operation such as a manhole or a small step.

A sonar device 40 includes a left corner sonar 41*a*, a front left sonar 41*b*, a front right sonar 41*c*, a right corner sonar 41*d*, and a sonar ECU 42. The left corner sonar 41*a*, the front left sonar 41*b*, the front right sonar 41*c*, and the right corner sonar 41*d* have the same configuration and are simply called "sonars" when there is no need to distinguish them from each other.

As shown in FIG. 2, the left corner sonar 41*a* is positioned at the front left corner of the host vehicle HV. The area where the left corner sonar 41*a* can detect a target (hereinafter referred to as "target detection area") is represented by area Rsa. The front left sonar 41*b* is positioned at the front end, and to the left of the center, of the host vehicle HV. The target detection area of the front left sonar 41*b* is represented by area Rsb.

The front right sonar 41*c* is positioned at the front end, and to the right of the center, of the host vehicle HV. The target detection area of the front right sonar 41*c* is represented by area Rsc. The right corner sonar 41*d* is positioned at the front right corner of the host vehicle HV. The target detection area of the right corner sonar 41*d* is represented by area Rsd.

Each sonar sends an ultrasonic wave to the corresponding target detection area and receives a reflected wave generated when the ultrasonic wave is reflected by a target. In addition, each sonar sends the sonar reflected-wave information to the sonar ECU 42. The sonar reflected-wave information includes the time from when an ultrasonic wave is sent to when the reflected wave is received and the signal representing the "frequency, intensity (reflection intensity), etc." of the received reflected wave.

The sonar ECU 42 measures the distance between each sonar and the target based on the sonar reflected-wave information. At the same time, based on the "distance from each of the two adjacent sonars to the target" and the "distance between the two adjacent sonars", the sonar ECU 42 acquires (calculates) sonar information every predetermined time period according to the triangulation method and sends the calculated sonar information to the driving assistance ECU 10. The sonar information includes the position of the target, the relative speed of the target, the intensity of the reflected wave received by the two adjacent sonars used to detect the position of the target (for example, the average of the reflection intensities included in the sonar reflected-wave information from the two adjacent sonars).

The driving assistance ECU 10 integrates the camera information and the radar information to generate "camera/radar fusion target information" that includes the position of the target (longitudinal distance to the target, lateral position of the target, direction of the target), the relative speed of the target, and the type of the target. In addition, the driving assistance ECU 10 integrates the sonar information and the radar information to generate “sonar/radar fusion target information” that includes the position of the target and the relative speed of the target.

A power train ECU 50 drives a power train actuator 51 to control the drive device, which includes the power source (not shown) of the host vehicle HV, for generating driving force.

A the brake ECU 60 drives a brake actuator 61 to control the braking device (not shown) of the host vehicle HV for applying a braking force to the host vehicle HV. The brake ECU 60 can drive the brake actuator 61 in response to an instruction from the driving assistance ECU 10 to automatically brake the host vehicle HV (can execute automatic braking).

A steering ECU 70 drives the steering motor 71 to control the steering device (not shown) of the host vehicle HV for changing the steering angle of the host vehicle HV. The steering ECU 70 can drive the steering motor 71 in response to an instruction from the driving assistance ECU 10 to automatically steer the host vehicle HV.

An alarm ECU 80 can control an alarm display device 81 that is placed at a position visible from the driver’s seat for outputting a predetermined display, and an alarm sound generator 82 that generates an alarm sound, in response to an instruction from the driving assistance ECU 10.

The driving assistance ECU 10 receives the detection values (output values) of the sensors given below.

- An accelerator pedal operation amount sensor 91 that detects the accelerator pedal operation amount AP of the host vehicle HV
- A brake pedal operation amount sensor 92 that detects the brake pedal operation amount BP of the host vehicle HV
- A vehicle speed sensor 93 that detects the speed of the host vehicle HV (that is, host vehicle speed Vh)
- A shift position sensor 94 that detects the shift position Sp of the shift lever of the host vehicle HV. The shift position Sp includes “D range and S range” that are a forward position, R range that is a reverse position, neutral range, parking range, etc.

Note that the driving assistance ECU 10 is connected also to other “sensors that detect the state of the host vehicle HV.”

Overview of Operation

When the precondition described below is satisfied and when it is determined that the collision avoidance execution condition is satisfied based on the sonar information (more precisely, sonar/radar fusion target information), the device DS executes automatic braking only when the execution permission condition described below is satisfied. In other words, even when the collision avoidance execution condition is satisfied, the device DS will not execute automatic braking when the precondition is satisfied but the execution permission condition is not satisfied.

Precondition

The precondition is satisfied when both conditions A1 and A2 described below are satisfied.

(Condition A1) The camera device 20 and the radar device 30 do not detect the same target (see S305 in FIG. 3 that will be described later).

(Condition A2) The sonar device 40 detects a target, but the intensity of the reflected wave (reflection intensity), received by the sonar that detects the target, is smaller than the intensity threshold value (see S315 and S320 in FIG. 3 that will be described later).

Execution Permission Condition

The execution permission condition is satisfied when all conditions B1 to B4 described below are satisfied.

(Condition B1) The host vehicle HV is positioned in a parking lot (see S330 in FIG. 3 that will be described later). Condition B1 is also referred to as an environmental condition. Note that condition B1 is not an essential condition for satisfying the execution permission condition.

(Condition B2) The same target detection condition, which is satisfied when the sonar device and the radar device 30 detect the same target, is satisfied (see S335 in FIG. 3 that will be described later).

(Condition B3) The immediately-after-startup condition is satisfied (see S340 in FIG. 3 that will be described later). The immediately-after-startup condition is a condition that is satisfied when the current time is within a period from a first point of time at which the host vehicle HV is started up so that the host vehicle HV becomes able to start to a second point of time at which the traveling determination condition, which is satisfied when the host vehicle HV starts traveling, is satisfied.

(Condition B4) The shift position is in the forward range, and the erroneous depression determination condition, which is satisfied when it is estimated that the driver of the host vehicle HV has erroneously depressed the accelerator pedal, is satisfied (see S345 and S350 in FIG. 3 that will be described later).

Specific Operation

While automatic braking, which will be described later, is not being executed, the CPU 10*a* (hereinafter simply referred to as “CPU”) of the driving assistance ECU 10 executes the routine, shown in the flowchart in FIG. 3, every predetermined time period (operation cycle) dt. In the description below, “step” will be written as “S.”

Figure 3:
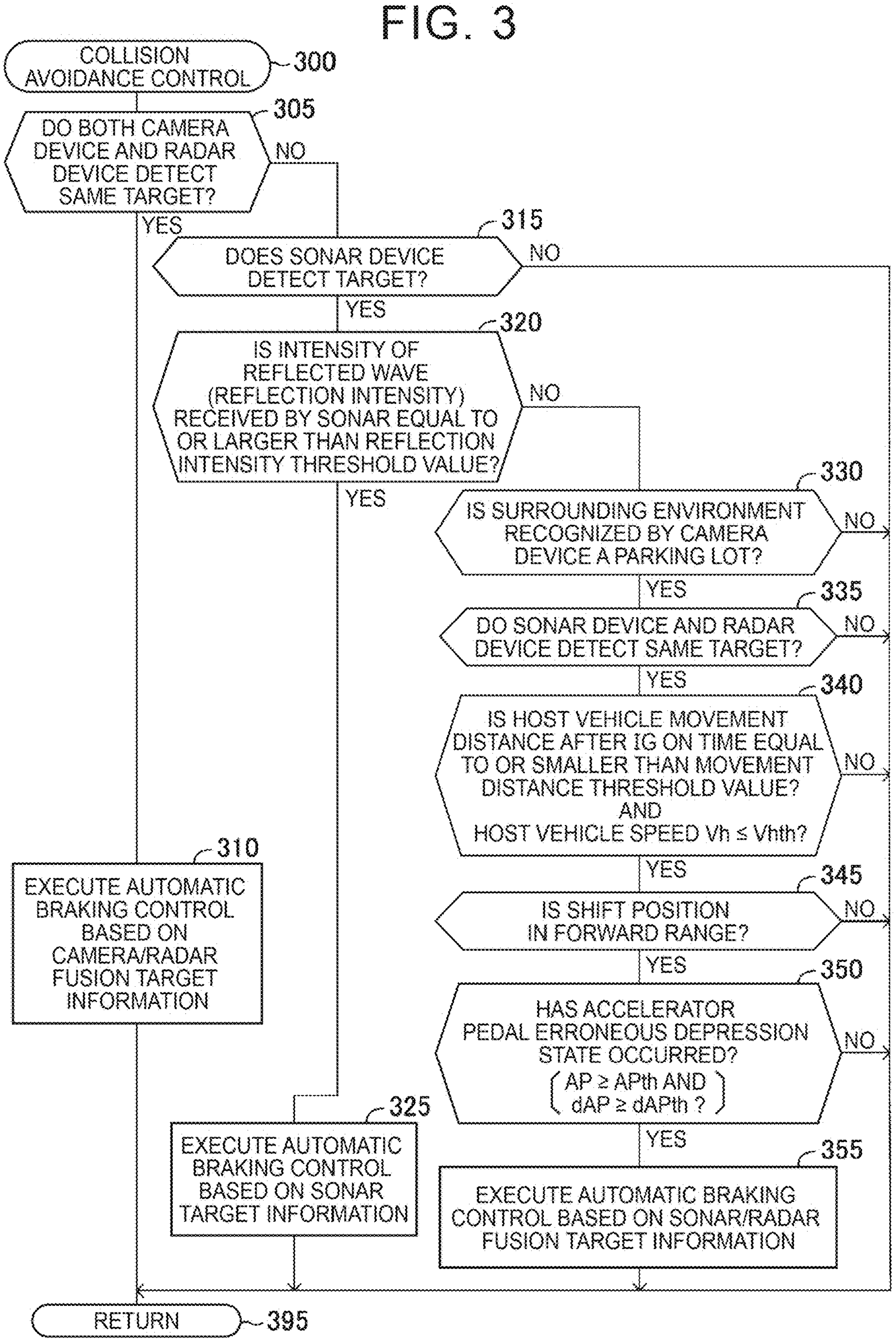
FIG. 3 is a routine executed by the CPU of a driving assistance ECU shown in FIG. 1.

When a predetermined time is reached while automatic braking is not being executed, the CPU starts processing from S300 in FIG. 3 and the processing proceeds to S305. In S305, the CPU determines whether the camera device 20 and the radar device 30 detect the same target by comparing the camera information and the radar information. That is, the CPU determines whether condition A1 described above is satisfied.

When the camera device 20 and the radar device 30 detect the same target, the processing proceeds from S305 to S310 and the CPU executes known automatic braking control (collision avoidance assistance control) based on the camera/radar fusion target information. For example, when it is determined, based on the camera/radar fusion target information, that the time to collision TTC to the target (=distance between target and host vehicle HV/relative speed of target) is equal to or smaller than the collision determination threshold value TTCth, the CPU executes automatic braking. After that, the processing proceeds to S395 and the CPU temporarily ends this routine.

On the other hand, when the camera device 20 and the radar device 30 do not detect the same target (that is, when condition A1 described above is satisfied), the processing proceeds from S305 to S315 and, based on the sonar information, the CPU determines whether the sonar device 40 detects a target.

When the sonar device 40 does not detect a target, the processing proceeds from S315 to S395.

When the sonar device 40 detects a target, the processing proceeds from S315 to S320 and the CPU determines whether the intensity of the reflected wave (reflection intensity) received by the sonar detecting the target is equal to or larger than the reflection intensity threshold value. In the processing in S315 and S320, the CPU determines whether condition A2 described above is satisfied.

When the intensity of the reflected wave is equal to or larger than the reflection intensity threshold value, the processing proceeds from S320 to S325 and the CPU executes known automatic braking control (collision avoidance assistance control) based on the sonar target information. For example, when it is determined, based on the sonar information, that the time to collision TTC to the target is equal to or smaller than the collision determination threshold value TTCth or that the distance between the target and host vehicle HV is equal to or smaller than the short distance determination threshold value, the CPU executes automatic braking. After that, the processing proceeds to S395.

On the other hand, when the intensity of the reflected wave is smaller (weaker) than the reflection intensity threshold value, the processing proceeds from S320 to S330 and, based on the camera information, the CPU determines whether the host vehicle HV is positioned in a parking lot. That is, the CPU determines whether condition B1 described above is satisfied. More specifically, the CPU extracts the feature points of the surrounding environment from the image data included in the camera information. When the number of feature points of the surrounding environment that match the feature points of a parking lot (for example, a double line indicating a parking space, a pair of wheel restraints, a scene where there are multiple parking spaces), which have been learned in advance by the driving assistance ECU 10, is larger than a predetermined value, the CPU determines that the host vehicle HV is positioned in a parking lot. Instead of this, when the number of "feature points of the surrounding environment extracted from the image data" that match the "feature points (e.g., marking lines defining lanes) of a road (general road and motorway)", which have been learned in advance by the driving assistance ECU 10, is smaller than a predetermined value, the CPU may determine that the host vehicle HV is positioned in a parking lot. In addition, when the host vehicle HV has a known navigation system, the CPU may determine whether the host vehicle HV is positioned in a parking lot based on the current position of the host vehicle HV, estimated based on the GPS signal, and the map information held by the navigation system.

When the host vehicle HV is positioned in a parking lot, the processing proceeds from S330 to S335 and the CPU determines whether the sonar device 40 and the radar device 30 detect the same target by comparing the sonar information and the radar information. That is, the CPU determines whether the same target detection condition, which is condition B2 described above, is satisfied.

When the sonar device 40 and the radar device 30 detect the same target, the processing proceeds from S335 to S340 and the CPU determines whether the immediately-after-startup condition, which is condition B3, is satisfied. The immediately-after-startup condition is a condition that is satisfied when the current time is within a period from the IG-ON time, which is the first point of time, to the second point of time at which the traveling determination condition is satisfied.

The IG ON time is a point of time at which the ignition key switch (not shown) of the host vehicle HV (including the startup switch of the host vehicle HV such as a ready switch) is changed from the OFF position to the ON position and the host vehicle HV becomes ready for travelling.

The traveling determination condition is a condition that is satisfied when at least one of the following two conditions is satisfied: (1) the host vehicle movement distance, which is the "distance traveled by the host vehicle HV without the ignition key switch being changed to the OFF position after the IG ON time", is larger than the movement distance threshold value and (2) the host vehicle speed Vh is higher than the vehicle speed threshold value Vhth.

Therefore, the immediately-after-startup condition is satisfied when the host vehicle movement distance from the IG ON time is equal to or smaller than the movement distance threshold value and when the host vehicle speed Vh is equal to or smaller than the vehicle speed threshold value Vhth.

When the immediately-after-startup condition is satisfied (that is, the host vehicle movement distance from the IG ON time is equal to or smaller than the movement distance threshold value and when the host vehicle speed Vh is equal to or smaller than the vehicle speed threshold value Vhth), the processing proceeds from S340 to S345 and the CPU determines whether the shift position is in the forward range (D range, S range, etc.) based on the shift position Sp received from the shift position sensor 94.

When the shift position is in the forward range, the processing proceeds from S345 to S350, and the CPU determines whether the state in which the accelerator pedal is erroneously depressed as the brake pedal (accelerator pedal erroneous depression state) has occurred. That is, through the processing in S345 and S350, the CPU determines whether condition B4 described above is satisfied.

More specifically, the CPU determines that an accelerator pedal erroneous depression state has occurred when both conditions C1 and C2 described below are satisfied.

(Condition C1) The accelerator pedal operation amount AP is equal to or larger than the accelerator pedal operation amount threshold value APth. That is, the accelerator pedal is heavily depressed.

(Condition C2) The "amount of change per unit time in the accelerator pedal operation amount AP (dAP)" immediately before the time at which the accelerator pedal operation amount AP becomes equal to or larger than the accelerator pedal operation amount threshold value APth is equal to or larger than the change-in-speed threshold value dAPth. That is, the accelerator pedal is depressed suddenly.

When the accelerator pedal erroneous depression state has occurred (that is, when both conditions C1 and C2 described above are satisfied), the processing proceeds from S350 to S355 and the CPU executes automatic braking control (collision avoidance assistance control) based on the sonar/radar fusion target information.

Figure 4:
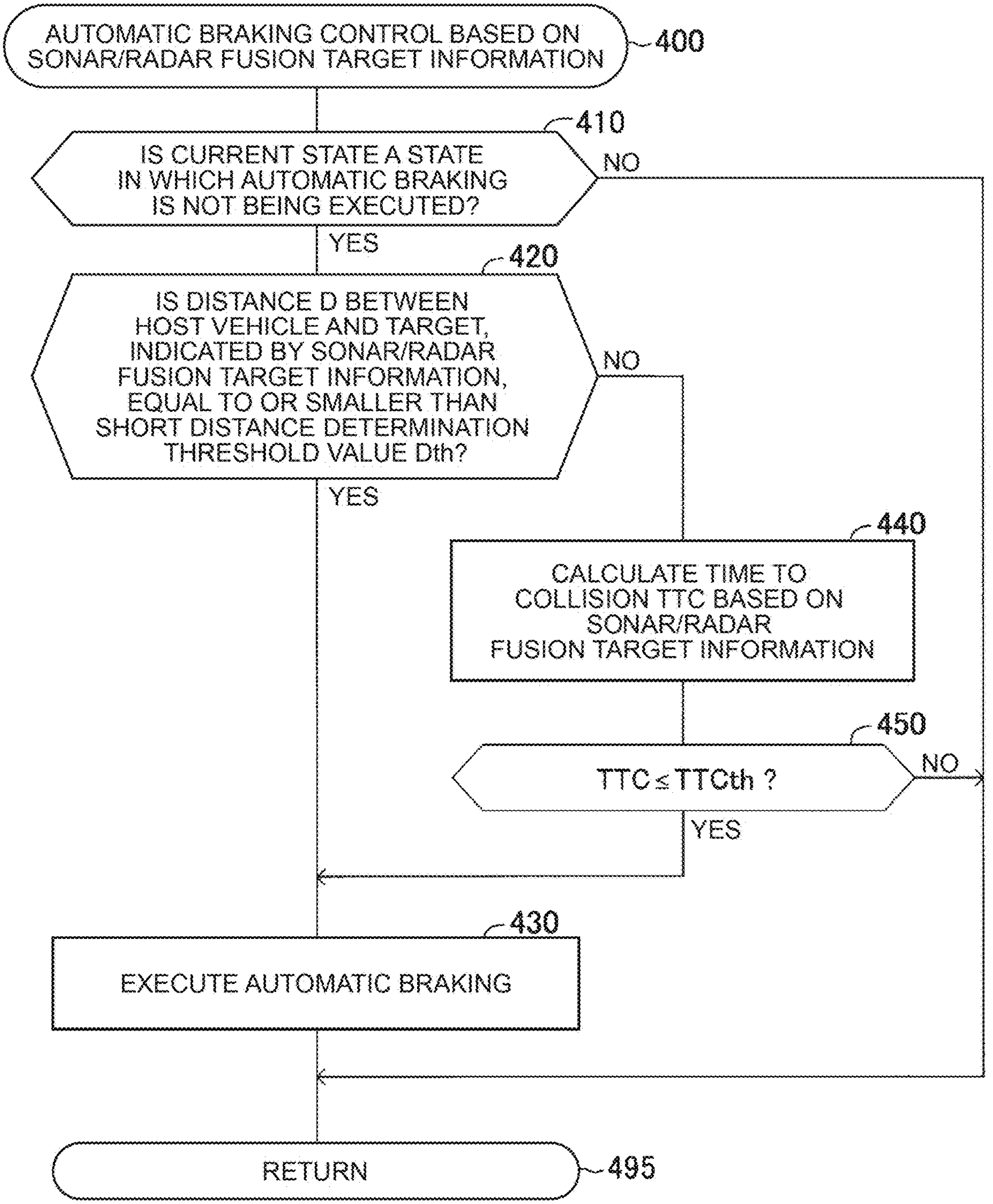
FIG. 4 is a subroutine executed by the CPU of the driving assistance ECU shown in FIG. 1.

More specifically, when the processing proceeds to S355, the CPU starts processing the subroutine, shown in FIG. 4, from S400 and the processing proceeds to S410.

In S410, the CPU determines whether the current state is "a state in which automatic braking is not being executed." When the current state is "a state in which automatic braking is being executed", the processing proceeds from S410 directly to S495, and then proceeds to S395 in FIG. 3.

On the other hand, when the current state is "a state in which automatic braking is not being executed", the processing proceeds from S410 to S420. Note that S410 may be omitted. In this case, the processing proceeds from S400 directly to S420.

In S420, the CPU determines whether the distance D between the host vehicle HV and the target is equal to or smaller than the short distance determination threshold value Dth, based on the sonar/radar fusion target information.

When the distance D is equal to or smaller than the short distance determination threshold value Dth, the processing proceeds from S420 to S430 and the CPU sends an instruction to the brake ECU 60 to execute automatic braking. In addition, the CPU sends an instruction to the alarm ECU 80 to cause the alarm display device 81 to display an alarm mark and the alarm sound generator 82 to generate an alarm sound. After that, the processing proceeds to S395 in FIG. 3.

On the other hand, when the distance D is larger than the short distance determination threshold value Dth, the processing proceeds from S420 to S440 and the CPU calculates the time to collision TTC to the target based on the sonar/radar fusion target information. The time to collision TTC is calculated by dividing the distance D by the relative speed of the target.

Next, the processing proceeds to S450 and the CPU determines whether the time to collision TTC is equal to or smaller than the collision determination threshold value TTCth. When the time to collision TTC is larger than the collision determination threshold value TTCth, the processing proceeds from S450 to S495 and, then, to S395 in FIG. 3.

On the other hand, when the time to collision TTC is equal to or smaller than the collision determination threshold value TTCth, the processing proceeds from S450 to S430. In S430, the CPU sends an instruction to the brake ECU 60 to execute automatic braking and, at the same time, sends an instruction to the alarm ECU 80 to cause the alarm display device 81 to display an alarm mark and the alarm sound generator 82 to generate an alarm sound. After that, the processing proceeds to S395 in FIG. 3.

When the determination result of the CPU is "No" in any of steps "S330 to S350" shown in FIG. 3, the processing proceeds directly to S395 from the step in which the determination result is "No." Therefore, in this case, automatic braking control is not executed.

In addition, the CPU may omit S330. In this case, when the determination result of S320 is "No", the processing proceeds to S335.

As described above, the device DS allows execution of automatic braking only when the predetermined execution permission condition, including the erroneous depression determination condition, is satisfied while the precondition is satisfied. Therefore, the device DS can reduce the frequency with which automatic braking is executed unnecessarily and, in addition, can reduce the possibility that the host vehicle HV will collide with a target immediately after the vehicle starts suddenly due to an erroneous depression of the accelerator pedal.

The present disclosure is not limited to the embodiment described above, and various modifications can be made within the scope of the present disclosure. For example, the device DS is applicable to a host vehicle HV that is an autonomous driving vehicle and in which the driving mode is changed from autonomous driving to driver's manual driving.

In addition, when "a rear camera, multiple sonars, and multiple radars" for detecting a target positioned directly behind the host vehicle HV are provided, the device DS may execute the above-described automatic braking control for a target detected by the rear camera, sonars, and radars. In this case, S345 in FIG. 3 is replaced by a step of determining whether the shift position is in the reverse range. In addition, the "determination as to whether the accelerator pedal erroneous depression determination condition is satisfied", which is made in S350 in FIG. 3, may be executed based on various known methods. That is, the device DS may determine that the accelerator pedal erroneous depression has occurred, for example, when the time it takes for the accelerator pedal operation amount AP to increase from a "first threshold value close to 0" to a "very large second threshold value" is less than a predetermined time.

What is claimed is:

1. A vehicle driving assistance device, comprising:

a sonar device configured to acquire sonar information using an ultrasonic wave, the sonar information including information on a target positioned around a host vehicle and information representing a reflection intensity of the ultrasonic wave reflected by the target;

a radar device configured to acquire radar information using a radio wave, the radar information being information on the target positioned around the host vehicle;

a surrounding environment information acquisition device that acquires surrounding environment information on a surrounding environment of the host vehicle; and a controller configured to:

determine whether the reflection intensity included in the sonar information is lower than a predetermined intensity threshold value;

determine whether the host vehicle is positioned in a parking lot based on the acquired surrounding environment information;

determine whether both the sonar information and the radar information include information on the same target;

determine whether an immediately-after-startup condition is satisfied, the immediately-after-startup condition being satisfied when a current time is within a period from a first point of time at which the host vehicle is started so that the host vehicle becomes able to start moving to a second point of time at which a predetermined traveling determination condition is satisfied, the predetermined traveling determination condition being satisfied when the host vehicle starts traveling;

determine whether a driver of the host vehicle is assumed to have erroneously depressed an accelerator pedal of the host vehicle;

integrate the sonar information and the radar information to generate sonar/radar fusion target information that includes a position of the target and a relative speed between the host vehicle and the target; and execute automatic braking for the host vehicle based on the sonar/radar fusion target information in a case where determinations are made that (i) the reflection intensity is lower than the predetermined intensity threshold value, (ii) the host vehicle is positioned in the parking lot, (iii) both the sonar information and the radar information include the information on the same target, (iv) the immediately-after-startup condition is satisfied, and (v) the driver of the host vehicle is assumed to have erroneously depressed the accelerator pedal.

2. The vehicle driving assistance device according to claim 1, wherein the surrounding environment information acquisition device includes:

a camera; and an image ECU configured to:

analyze image data received from the camera, to generate camera information at every predetermined time period; and send the generated camera information to the controller.

3. The vehicle driving assistance device according to claim 1, wherein the surrounding environment information acquisition device is a navigation system.

4. The vehicle driving assistance device according to claim 1, wherein the controller is further configured to:

determine, based on the sonar/radar fusion target information, whether a distance between the host vehicle and the target is equal to or less than a first threshold value; and execute the automatic braking for the host vehicle in a case where a determination is made that the distance is equal to or less than the first threshold value.

5. The vehicle driving assistance device according to claim 4, wherein the controller is further configured to:

determine, based on the sonar/radar fusion target information, whether a time until the host vehicle collides with the target is equal to or less than a second threshold value; and execute the automatic braking for the host vehicle in a case where (i) a determination is made that the distance is greater than the first threshold value and (ii) the time until the host vehicle collides with the target is equal to or less than the second threshold value.

6. The vehicle driving assistance device according to claim 1, wherein the controller is further configured to:

determine whether both the sonar information and the surrounding environment information acquisition device include information on the same target;

determine whether both the radar information and the surrounding environment information include information on the same target;

integrate the surrounding environment information and the radar information to generate surrounding environment/radar fusion target information that includes the position of the target and the relative speed between the host vehicle and the target;

execute the automatic braking for the host vehicle based on the surrounding environment/radar fusion target information in a case where a determination is made that both the sonar information and the surrounding environment information include information on the same target; and execute the automatic braking for the host vehicle based only on the sonar information in a case where (i) determinations are not made that both the radar information and the surrounding environment information include information on the same target, and (ii) the reflection intensity included in the sonar information is equal to or greater than the predetermined intensity threshold value.

7. The vehicle driving assistance device according to claim 6, wherein the controller is further configured to:

determine, based on the sonar/radar fusion target information, whether a distance between the host vehicle and the target is equal to or smaller than a first threshold value; and execute the automatic braking for the host vehicle in a case where a determination is made that the distance is equal to or smaller than the first threshold value.

8. The vehicle driving assistance device according to claim 7, wherein the controller is further configured to:

determine, based on the sonar/radar fusion target information, whether a time until the host vehicle collides with the target is equal to or less than a second threshold value; and execute the automatic braking for the host vehicle in a case where (i) a determination is made that the distance is greater than the first threshold value and (ii) the time until the host vehicle collides with the target is equal to or less than the second threshold value.

9. The vehicle driving assistance device according to claim 8, wherein the surrounding environment information acquisition device includes:

a camera; and an image ECU configured to:

analyze image data received from the camera, to generate camera information at every predetermined time period; and send the generated camera information to the controller.

10. A vehicle driving assistance method comprising:

acquiring sonar information from a sonar device using an ultrasonic wave, the sonar information including information on a target positioned around a host vehicle and information representing a reflection intensity of the ultrasonic wave reflected by the target;

acquiring radar information using a radio wave, the radar information being information on the target positioned around the host vehicle;

acquiring surrounding environment information on a surrounding environment of the host vehicle;

determining whether the reflection intensity included in the sonar information is lower than a predetermined intensity threshold value;

determining whether the host vehicle is positioned in a parking lot based on the acquired surrounding environment information;

determining whether both the sonar information and the radar information include information on the same target;

determining whether an immediately-after-startup condition is satisfied, the immediately-after-startup condition being satisfied when a current time is within a period from a first point of time at which the host vehicle is started so that the host vehicle becomes able to start moving to a second point of time at which a predetermined traveling determination condition is satisfied, the predetermined traveling determination condition being satisfied when the host vehicle starts traveling;

determining whether a driver of the host vehicle is assumed to have erroneously depressed an accelerator pedal of the host vehicle;

integrating the sonar information and the radar information to generate sonar/radar fusion target information that includes a position of the target and a relative speed between the host vehicle and the target; and executing automatic braking for the host vehicle based on the sonar/radar fusion target information in a case where determinations are made that (i) the reflection intensity is lower than the predetermined intensity threshold value, (ii) the host vehicle is positioned in the parking lot, (iii) both the sonar information and the radar information include the information on the same target, (iv) the immediately-after-startup condition is satisfied, and (v) the driver of the host vehicle is assumed to have erroneously depressed the accelerator pedal.

* * * * *